United States Patent
Jagow

(10) Patent No.: US 10,251,334 B2
(45) Date of Patent: Apr. 9, 2019

(54) QUICK DEPTH ADJUSTMENT FOR PARALLEL ARM OPENERS

(71) Applicant: Bourgault Industries Ltd., St. Brieux (CA)

(72) Inventor: Scot Jagow, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 53 days.

(21) Appl. No.: 15/706,836

(22) Filed: Sep. 18, 2017

(65) Prior Publication Data
US 2018/0338411 A1    Nov. 29, 2018

(30) Foreign Application Priority Data
May 24, 2017    (CA) .................................... 2968181

(51) Int. Cl.
| | |
|---|---|
| *A01B 63/24* | (2006.01) |
| *A01C 7/20* | (2006.01) |
| *A01B 63/00* | (2006.01) |
| *A01B 63/16* | (2006.01) |

(52) U.S. Cl.
CPC ............ *A01C 7/203* (2013.01); *A01B 63/008* (2013.01); *A01B 63/16* (2013.01); *A01B 63/24* (2013.01); *A01C 7/208* (2013.01)

(58) Field of Classification Search
CPC ....... A01B 35/30; A01B 39/24; A01B 63/002; A01B 63/008; A01B 63/24
USPC ................................. 172/175, 176, 484, 615
See application file for complete search history.

(56) References Cited

U.S. PATENT DOCUMENTS

| | | | |
|---|---|---|---|
| 3,517,747 A | 6/1970 | Fischer | |
| 5,234,060 A * | 8/1993 | Carter ................... | A01C 7/205 172/260.5 |
| 5,396,851 A | 3/1995 | Beaujot | |
| 5,398,771 A | 3/1995 | Hornung et al. | |
| 5,609,114 A | 3/1997 | Barton | |
| 7,159,523 B2 | 1/2007 | Bourgault et al. | |
| 7,261,048 B1 * | 8/2007 | Hantke ................. | A01B 63/32 111/136 |

(Continued)

FOREIGN PATENT DOCUMENTS

EP    2 712 492    *    4/2014

OTHER PUBLICATIONS

Australian Office Action, Examination report No. 1 for standard patent application, dated Dec. 7, 2018 for Application No. AU 2017235926, 8 pgs.

*Primary Examiner* — Gary S Hartmann
(74) *Attorney, Agent, or Firm* — Frost Brown Todd LLC

(57) ABSTRACT

A parallel arm furrow opener assembly defines upper and lower front pivot axes and upper and lower rear pivot axes oriented horizontally and perpendicular to a travel direction. A furrow opener and a packer wheel are attached to a rear link of the assembly. In operation the furrow opener and the packer wheel are in fixed positions with respect to the rear link member, and a bias element is operative to exert a downward bias force on the furrow opener assembly. A front pivot line connecting the upper and lower front pivot axes is parallel to a rear pivot line connecting the upper and lower rear pivot axes, and the front and rear pivot lines are oriented at a pivot angle with respect to a vertical orientation, and the pivot angle is adjustable to vary a furrow depth of the furrow.

25 Claims, 10 Drawing Sheets

(56) References Cited

U.S. PATENT DOCUMENTS

| | | |
|---|---|---|
| 7,549,481 B2 | 6/2009 | Lung et al. |
| 8,220,559 B2 * | 7/2012 | Ryan .................. A01C 7/06 |
| | | 111/111 |
| 8,733,466 B2 * | 5/2014 | Henry ............... A01B 61/046 |
| | | 111/151 |
| 9,674,997 B2 * | 6/2017 | Ryder ................ A01C 7/203 |
| 9,706,704 B2 * | 7/2017 | Ryan .................. A01C 5/062 |
| 2011/0282556 A1 | 11/2011 | Klenz et al. |
| 2018/0338411 A1 * | 11/2018 | Jagow ................ A01C 7/203 |

\* cited by examiner

QUICK DEPTH ADJUSTMENT FOR PARALLEL ARM OPENERS

CROSS-REFERENCE TO RELATED APPLICATION

This application claims priority to and benefit of CA Serial No. 2,968,181, filed May 24, 2017, the contents of which are incorporated by reference in their entirety for all purposes.

FIELD OF THE INVENTION

This disclosure relates to the field of agricultural implements and in particular a seeding implement with parallel arm furrow opener assemblies where the depth of penetration into the soil of the furrow openers can be adjusted quickly.

BACKGROUND

Trailing arm furrow opener assemblies are well known in the agricultural industry. These assemblies are spaced across the width of a seeding implement and each comprises a lengthy arm that is pivotally attached at the front end thereof to the implement frame about a horizontal pivot axis oriented perpendicular to the operating travel direction such that the arm can pivot up and down with respect to the frame. A packer wheel is mounted to a rear end of the arm and one or more furrow opener shanks extend downward from the arm forward of the packer wheel. A bias element such as a spring or hydraulic cylinder exerts a downward bias force on the arm to push the furrow opener mounted on the bottom of the shank into the soil to create a furrow, and the furrow depth is set by the relative positions of the packer wheel and furrow opener.

Such a trailing arm furrow opener assembly is disclosed for example in U.S. Pat. No. 7,159,523 to Bourgault et al. particularly in FIG. 1 thereof. Similarly U.S. Pat. No. 5,396,851 to Beaujot discloses such a trailing arm with two furrow opener shanks with knife type furrow openers attached to the bottoms thereof and configured to make two slightly laterally spaced furrows, one for seeds and the other for fertilizer. U.S. Pat. No. 5,609,114 to Barton discloses a similar trailing arm with one or two disc type furrow openers mounted to the arm.

Seeding operations require that a consistent furrow depth be maintained. The desired seeding depth will also vary depending on the crop being planted, with a deeper furrow depth for larger seeds such as corn and peas and a shallower furrow depth for smaller seeds such as canola. In many common trailing arm type seeding implements the frame is mounted on fixed wheels so the distance from the frame to the ground surface is constant. The furrow opener assemblies are then pivoted about the front arm axis to move between an operating position engaged in the ground and a transport position above the ground. The furrow depth is adjusted by moving each packer wheel up or down with respect to the corresponding furrow opener. A typical seeding implement may have 80 or more furrow opener assemblies, and changing the furrow depth is a time consuming operation.

Maintaining consistent furrow depth is problematic with trailing arm furrow opener assemblies with a single arm such as that of Bourgault, Barton, and Beaujot in uneven terrain where the distance between the frame and the ground varies. As the vertical distance of the frame above the ground varies the trailing arm moves up and down about its pivotal attachment to the seeder and the angle of the trailing arm changes such that the distance from the middle portion of the arm, where the furrow opener is attached, to the ground varies, and thus the actual depth of the seed furrow varies.

While this property is problematic for furrow depth consistency in uneven terrain, it is also useful for providing a relatively quick way to change the furrow depth when changing from one crop to another. The implement frame may be mounted on movable wheels so the distance between the frame and the ground surface can be adjusted, and such an adjustment of the frame height also changes the furrow depth.

To improve the consistency of the furrow depth Bourgault et al. also disclose, in FIGS. 5-9 of U.S. Pat. No. 7,159,523, a trailing arm formed by upper and lower parallel arms of equal length. Front ends of the arms are pivotally connected to a front link member fixed to the implement frame, and rear ends of the arms are pivotally connected to a rear link member. Such a parallel link assembly has the property that the rear link member is maintained in a constant horizontal and vertical orientation through the vertical range of motion without tilting forward or rearward. The front link member thereof is fixed to the implement frame and the rear packer wheel and the furrow opener are fixed to the rear link member. Thus as the packer wheel moves up and down relative to the frame in uneven terrain, the packer wheel and furrow opener move together vertically and so the furrow depth is maintained at a constant depth. In these parallel arm assemblies the furrow depth is adjusted by the time consuming operation of moving each packer wheel up or down with respect to the corresponding furrow opener.

A further issue with seeding implements is the fore and aft presentation angle of the furrow opener with respect to the ground surface. Furrow openers typically include a pointed front end or tip that is oriented to engage the soil and draw the furrow opener into the soil. The product tube deposits agricultural product generally behind the tip after the furrow has been formed and before the soil moved aside to create the furrow can drop back into the furrow so that the product is at the bottom of the furrow, and the soil falls back on top of the product. Some furrow openers make more than one furrow, with product divided between the furrows, or with different product directed to each furrow.

Thus as the fore and aft presentation angle changes, the angular relationship between the furrow opener and the soil, which dictates the form of the furrow made, and the relationship between the furrow opener and the product tube, which dictates the location of the agricultural product in the furrow, changes as well. In a conventional trailing arm furrow opener assembly with a single arm, as the arm moves up and down with respect to the frame, the presentation angle changes.

Parallel arm assemblies fix the fore and aft presentation angle of the furrow openers with respect to the ground as the furrow opener moves up and down in uneven terrain such that the presentation angle does not change.

U.S. Pat. No. 7,549,481 to Lung et al. addresses the issue of providing a consistent presentation angle by providing a parallel arm assembly where only the furrow opener is attached to the rear link member and the packer wheel is attached to a rear end of one of the upper and lower arms of the parallel arm assembly. In this arrangement the parallel arm assembly moves up and down in the same manner as a single arm furrow opener assembly, with the furrow depth varying in uneven terrain, however the presentation angle is maintained constant as the arm assembly moves up and down. As in a conventional single arm assembly, depth adjustment can be accomplished by raising and lowering the implement frame with respect to the ground.

It is also known to add remote actuation to each trailing arm opener to adjust the position of the packer wheel to change the depth of the furrow as disclosed in United States Published Patent Application Number 2011/0282556 of Klenz et al. However this solution to improve the ease and efficiency of depth adjustment on each opener is expensive and adds reliability concerns due to the added electronics in a somewhat harsh operating environment.

BRIEF SUMMARY

The present disclosure provides a seeding apparatus that overcomes problems in the prior art.

In a first embodiment the present disclosure provides a seeding apparatus comprising an implement frame mounted on wheels for travel over the ground in an operating travel direction and a furrow opener assembly extending rearward from a lateral frame member of the implement frame. The furrow opener assembly comprises a front link member fixed to the lateral frame member, and upper and lower parallel arm members pivotally attached at front ends thereof to the front link member about corresponding upper and lower front pivot axes oriented substantially horizontally and perpendicular to the operating travel direction, and pivotally attached at rear ends thereof to a rear link member about corresponding upper and lower rear pivot axes oriented substantially parallel to the front pivot axes. A furrow opener bracket is attached to the rear link member, and a furrow opener is attached to a lower portion of the furrow opener bracket, and the furrow opener is operative to form a furrow when a bottom end thereof is engaged in the ground. A packer wheel arm is attached to the rear link member and a packer wheel is rotatably attached to a rear end of the packer wheel arm. In operation the furrow opener and the packer wheel are in fixed positions with respect to the rear link member, and a bias element is operative to exert a downward bias force on the furrow opener assembly. A raising mechanism is operative to move the furrow opener assembly between a lowered operating position and a raised transport position. A front pivot line connecting the upper and lower front pivot axes is substantially parallel to a rear pivot line connecting the upper and lower rear pivot axes, and the front and rear pivot lines are oriented at a pivot angle with respect to a vertical orientation, and the pivot angle is adjustable to vary a furrow depth of the furrow.

In a second embodiment the present disclosure provides a seeding apparatus comprising an implement frame mounted on wheels for travel over the ground in an operating travel direction, and a rockshaft rotatably attached to a lateral frame member of the implement frame about a lateral rotation axis, and a lock mechanism operative to secure the rockshaft at a selected rotational position. A furrow opener assembly extends rearward from the lateral frame member and the rockshaft and comprises a frame parallel arm assembly comprising a front frame link member fixed to the lateral frame member and defining upper and lower front frame pivot axes, and a rear frame link member defining upper and lower rear frame pivot axes, wherein the frame pivot axes are arranged so that a front frame pivot line between the upper and lower front frame pivot axes and a rear frame pivot line between the upper and lower rear frame pivot axes are substantially parallel and of substantially equal length, and a rockshaft parallel arm assembly comprising a front rockshaft link member fixed to the rockshaft and defining upper and lower front rockshaft pivot axes and a rear rockshaft link member defining upper and lower rear rockshaft pivot axes, wherein the rockshaft pivot axes are arranged so that a front rockshaft pivot line between the upper and lower front rockshaft pivot axes and a rear rockshaft pivot line between the upper and lower rear rockshaft pivot axes are substantially parallel and of substantially equal length. A furrow opener bracket is attached to the rear rockshaft link member and connected during operation to the rear frame link member with a furrow opener attached to a lower portion of the furrow opener bracket, the furrow opener operative to form a furrow when a bottom end thereof is engaged in the ground. A packer wheel arm is attached to the rear frame link member and the rear rockshaft link member and a packer wheel is rotatably attached to a rear end of the packer wheel arm. A bias element is operative to exert a downward bias force on the furrow opener assembly, and a raising mechanism is operative to move the furrow opener assembly between a lowered operating position and a raised transport position. A furrow depth of the furrow is adjusted from a first depth to a second depth by rotating the rockshaft from a first rotational position to a second rotational position, and a fore and aft presentation angle of the furrow opener is maintained at a constant angle.

In a third embodiment the present disclosure provides a method of forming a furrow in a ground surface. The method comprises connecting a front link member of a parallel arm assembly to a lateral frame member of an implement frame mounted on wheels for travel over the ground surface in an operating travel direction such that the parallel arm assembly extends rearward from the lateral frame member; wherein a front pivot line connects upper and lower front pivot axes of the parallel arm assembly and is substantially parallel to a rear pivot line connecting upper and lower rear pivot axes of the parallel arm assembly, and the front and rear pivot lines are oriented at a pivot angle with respect to a vertical orientation; connecting a furrow opener bracket to a rear link member of the parallel arm assembly, and attaching a furrow opener to a lower portion of the furrow opener bracket, wherein the furrow opener is operative to form the furrow when a bottom end thereof is engaged in the ground surface; supporting the rear link member with a packer wheel rearward of the furrow opener; exerting a downward bias force on the parallel arm assembly such that the furrow opener engages the ground surface; moving the implement frame across the ground surface to create the furrow; orienting the pivot angle at a first pivot angle to form the furrow with a first furrow depth, and orienting the pivot angle at a second pivot angle to form the furrow with a second furrow depth different from the first furrow depth.

The present disclosure provides a seeding apparatus with trailing arm furrow opener assemblies where the depth of the furrow formed by the furrow openers can be quickly changed to suit different crops and soil conditions. The depth of penetration of all the furrow openers on a seeding implement can be adjusted at the same time. In some embodiments the presentation angle of the furrow opener with respect to the ground surface can be maintained at a constant desired angle.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
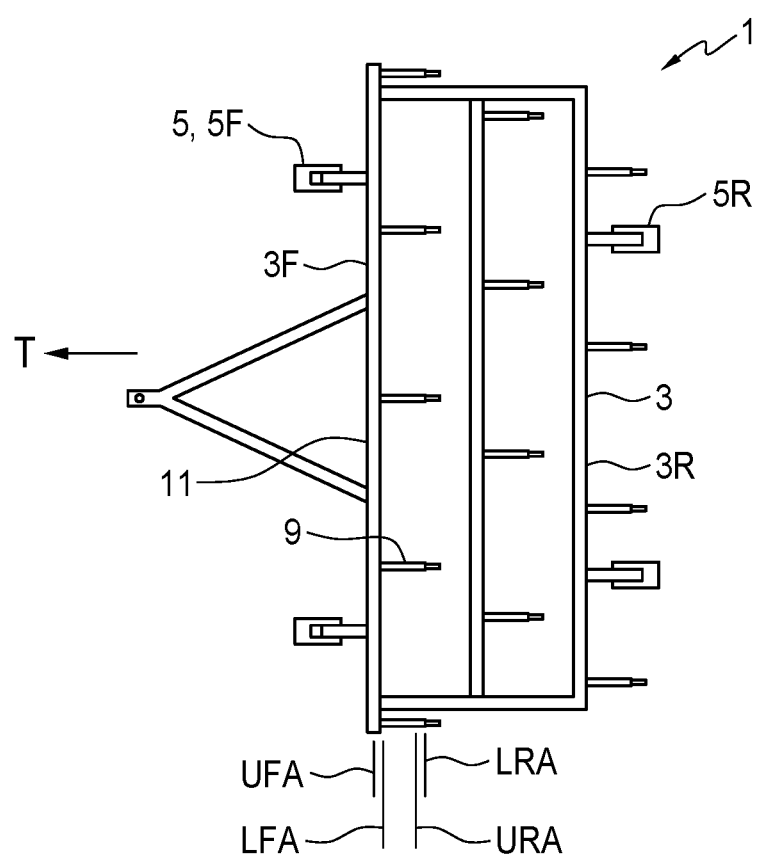
FIG. 1 is a schematic top view of an embodiment of the seeding apparatus of the present disclosure.

FIGS. 1-4 schematically illustrate an embodiment of a seeding apparatus 1 of the present disclosure comprising an implement frame 3 mounted on wheels 5 for travel over the ground 7 in an operating travel direction T. A plurality of furrow opener assemblies 9 is mounted on the implement frame 3. Each furrow opener assembly 9 extends rearward from a lateral frame member 11 of the implement frame 3 and comprises a front link member 13 fixed to the lateral frame member 11, and upper and lower parallel arm members 15A, 15B are pivotally attached at front ends thereof to the front link member 13 about corresponding upper and lower front pivot axes UFA, LFA oriented substantially horizontally and perpendicular to the operating travel direction T, and pivotally attached at rear ends thereof to a rear link member 17 about corresponding upper and lower rear pivot axes URA, LRA oriented substantially parallel to the front pivot axes UFA, ULA.

A furrow opener bracket 19 is attached to the rear link member 17, and a furrow opener 21 is attached to a lower portion of the furrow opener bracket 19. The furrow opener 21 is operative to form a furrow 23 when a bottom end thereof is engaged in the ground 7. A packer wheel arm 25 is attached to the rear link 17 and a packer wheel 27 is rotatably attached to a rear end of the packer wheel arm 25. The vertical position of the packer wheel 27 with respect to the furrow opener 21 may be adjustable to provide a wider range of furrow depth however during a seeding operation the furrow opener 21 and the packer wheel 27 are in fixed positions with respect to the rear link member 17. The furrow openers schematically illustrated in this disclosure are, for simplicity of illustration, shown as knife or hoe type openers however it will be recognized that a disc opener could also be rotatably mounted to the lower portion of the furrow opener brackets illustrated herein.

Thus the furrow openers assembly 9 includes a parallel arm assembly with the front link 13 fixed to the implement frame 3 and the furrow opener 21 and packer wheel 27 both fixed to the rear link 17. As known in the art, this furrow opener assembly 9 can pivot up and down with respect to the implement frame 3 and the depth of the furrow 23 created by the furrow opener 21 will remain constant.

A bias element, typically a hydraulic cylinder 29 as illustrated, is operative to exert a downward bias force DBF on the furrow opener assembly 9. The hydraulic cylinder 29 typically also provides the raising mechanism operative to move the furrow opener assemblies 9 between a lowered operating position 9A and a raised transport position 9B as schematically illustrated in FIG. 4.

A front pivot line FPL connecting the upper and lower front pivot axes UFA, LFA is substantially parallel to a rear pivot line RPL connecting the upper and lower rear pivot axes URA, LRA, and the front and rear pivot lines FPL, RPL are oriented at a pivot angle PN with respect to a vertical orientation V, and the pivot angle PN is adjustable to vary a furrow depth of the furrow 23.

In the illustrated apparatus 1, the pivot angle is adjusted by selectively tilting a front end 3F of the implement frame 3 up or down with respect to a rear end 3R of the implement frame 3 to adjust the pivot angle PN. The implement frame 3 is mounted on front wheels 5F and rear wheels 5R, and the front wheels 5F and the rear wheels 5R are moved selectively up or down with respect to the implement frame 3 to tilt the front end 3F of the implement frame 3 up or down with respect to the rear end 3R of the implement frame 3.

Figure 2:
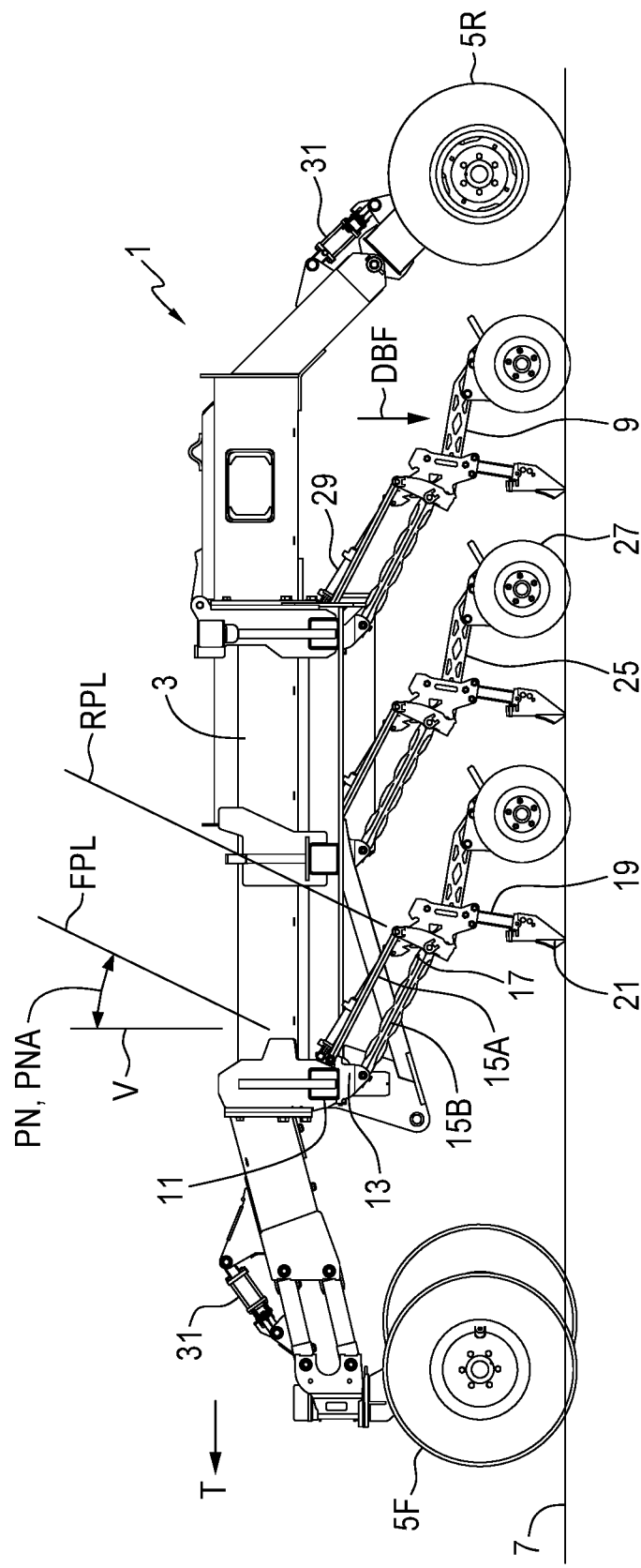
FIG. 2 is a side view of the embodiment of FIG. 1 where the front and rear ends of the implement frame are the same distance above the ground.
Figure 3:
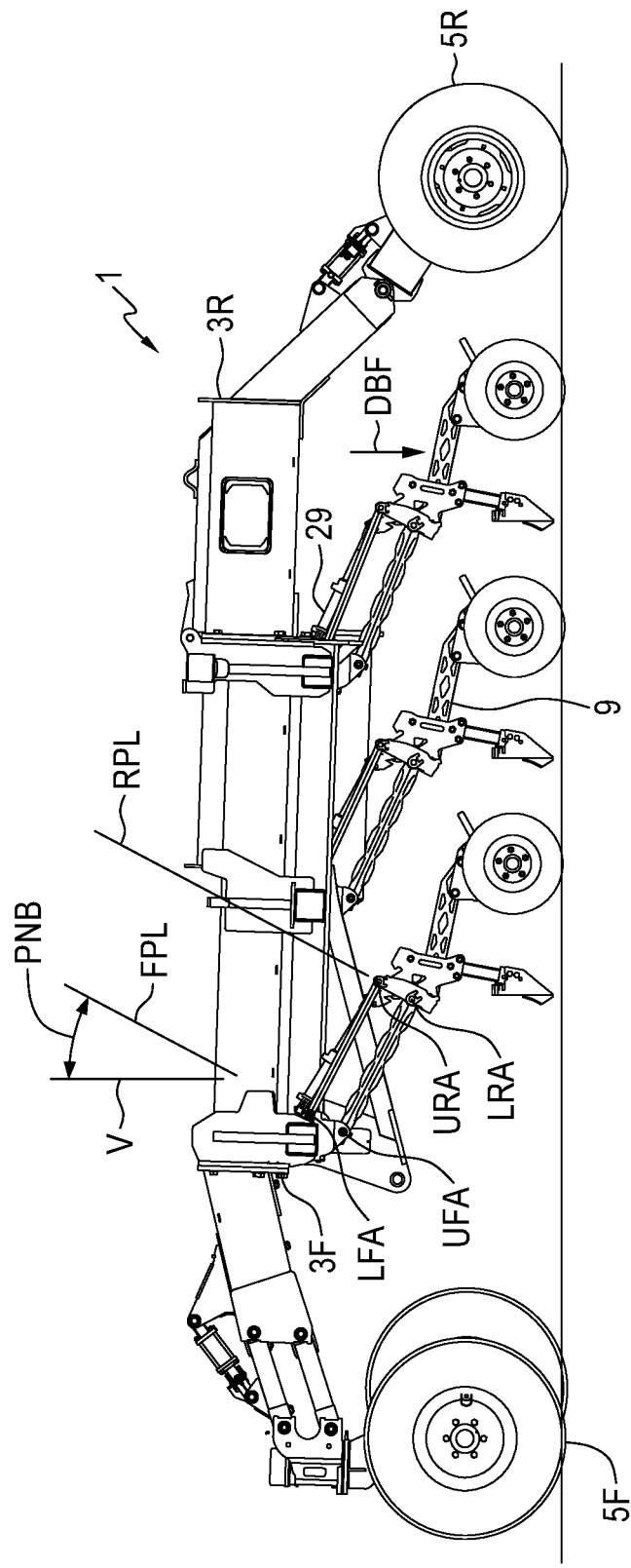
FIG. 3 is a side view of the embodiment of FIG. 1 where the front end of the implement frame is higher than the rear end thereof.
Figure 4:
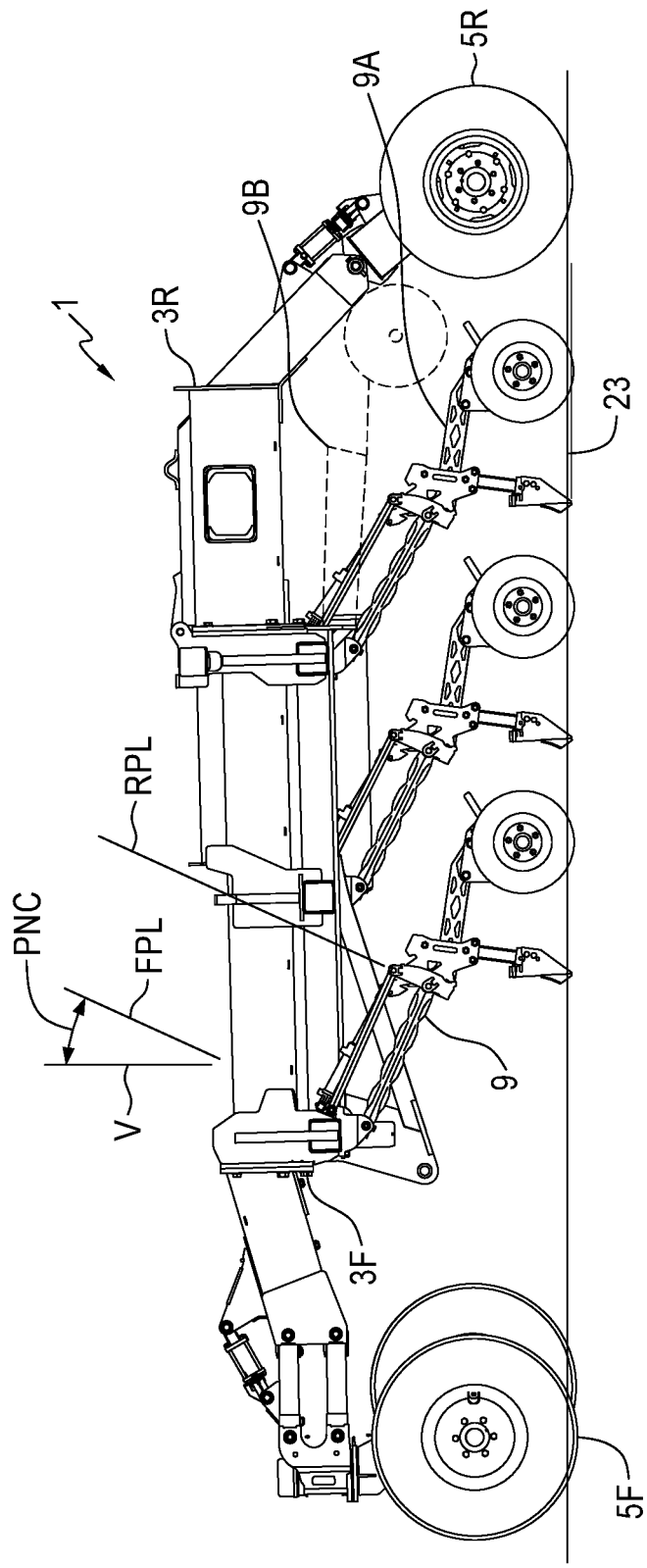
FIG. 4 is a side view of the embodiment of FIG. 1 where the front end of the implement frame is lower than the rear end thereof.

FIGS. 2-4 schematically illustrate this tilting of the implement frame 3 and the resulting change in the pivot angle PN. In FIGS. 2-4 the line representing the ground 7 is placed at a fixed location with respect to the implement wheels 5 and the packer wheels 27 to illustrate the changes in the vertical position of the bottom of the furrow openers 21 with respect to the ground 7, and with respect to the implement wheels 5 and the packer wheels 27 which follow the ground.

In FIG. 2 the implement frame 3 is oriented substantially level with all lateral frame members 11 the same distance above the ground surface 7, and the front pivot line FPL oriented at a first pivot angle PNA. The bottom ends of the furrow openers 21 are on the line 7 representing the ground surface.

In FIG. 3 the front wheels 5F are moved downward and the rear wheels 5R are moved upward with respect to the implement frame 3 by wheel actuators 31 to tilt the front end 3F of the implement frame 3 up with respect to the rear end 3R thereof compared to the level orientation of FIG. 2. Tilting the front end 3F of the implement frame 3 up with respect to the rear end 3R thereof moves the upper front pivot axis UFA rearward with respect to the lower front pivot axis LFA and the front pivot line FPL is oriented at a second pivot angle PNB that is greater than the first pivot angle PNA. In FIG. 3 the bottom ends of the furrow openers 21 are slightly above the line 7 representing the ground surface, indicating the furrow openers 21 have been raised with respect to the ground surface 7 and with respect to the implement wheels 5 and the packer wheels 27 which follow the ground, and thus the depth of the furrow 23 is decreased.

In FIG. 4 the front wheels 5F are moved upward and the rear wheels 5R are moved downward with respect to the implement frame 3 by wheel actuators 31 to tilt the front end 3F of the implement frame 3 down with respect to the rear end 3R thereof compared to the level orientation of FIG. 2. Tilting the front end 3F of the implement frame 3 down with respect to the rear end 3R thereof moves the upper front pivot axis UFA forward with respect to the lower front pivot axis LFA and the front pivot line FPL is oriented at a third pivot angle PNC that is less than the first pivot angle PNA. In FIG. 4 the bottom ends of the furrow openers 21 are slightly below the line 7 representing the ground surface, indicating the furrow openers 21 have been lowered with respect to the ground surface 7 and with respect to the implement wheels 5 and the packer wheels 27 which follow the ground, and thus the depth of the furrow 23 is increased.

In the illustrated apparatus 1 both the front and rear wheels 5F, 5R are moved up and down however it is contemplated that tilting of the implement frame 3 could be accomplished by moving only the front wheels 5F or only the rear wheels 5R. In a typical seeding operation a desired furrow depth change might be only 0.5 inches or less and it can be seen that tilting the implement frame 3 only slightly may accomplish the desired change.

Figure 5:
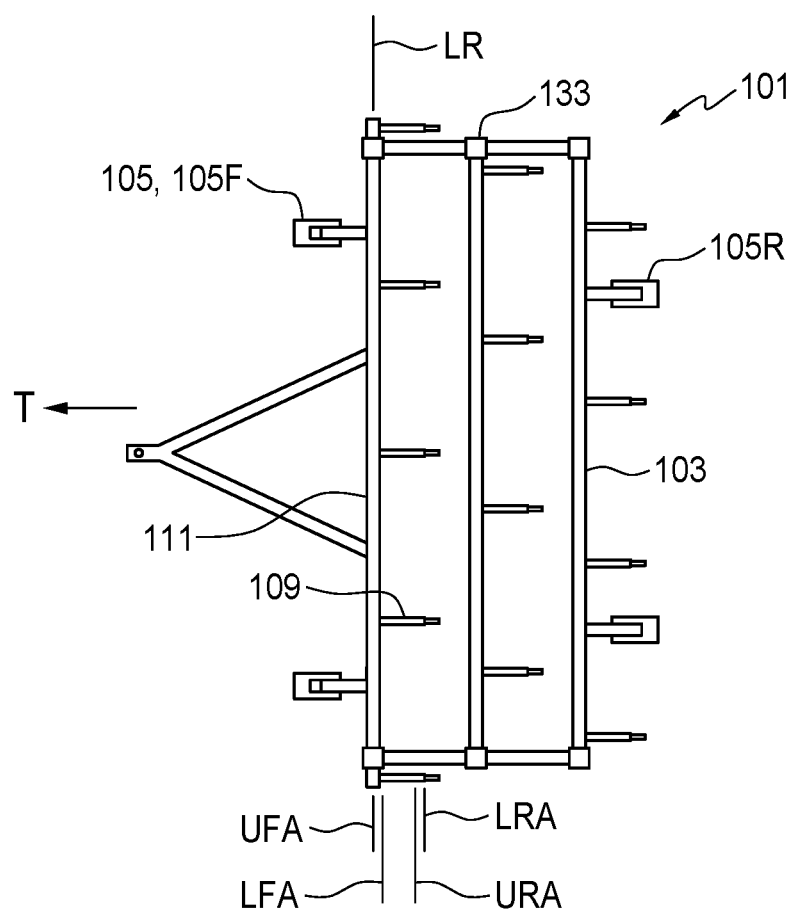
FIG. 5 is a schematic top view of an alternate embodiment of the seeding apparatus of the present disclosure.
Figure 6:
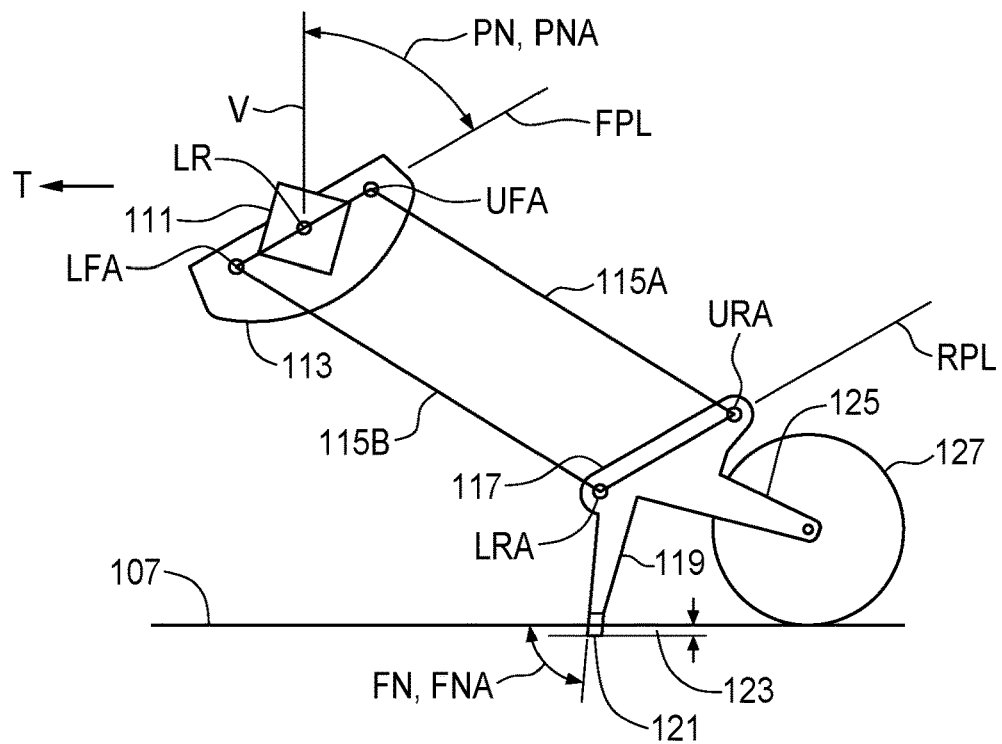
FIG. 6 is a schematic side view of a furrow opener assembly of the embodiment of FIG. 5 shown in a first position forming a furrow with a first depth.
Figure 7:
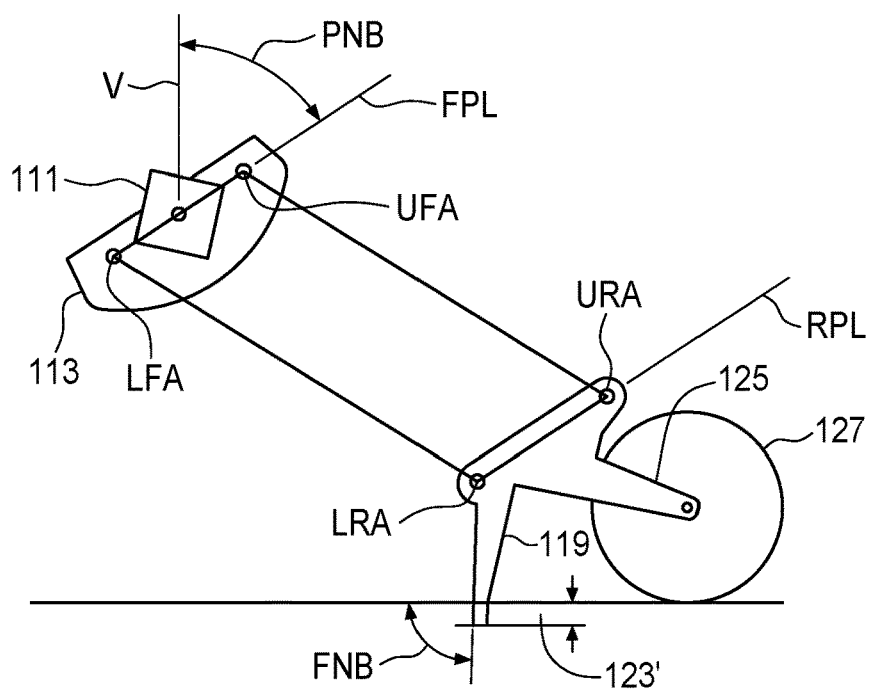
FIG. 7 is a schematic side view of a furrow opener assembly of the embodiment of FIG. 5 shown in a second position forming a furrow with a second depth greater than the first depth.

FIGS. 5-7 schematically illustrate an alternate apparatus 101 of the present disclosure comprising an implement frame 103 mounted on wheels 105 for travel over the ground 107 in an operating travel direction T. In the apparatus 101 front and rear wheels 105F, 105R support the implement frame 103 at a constant height above the ground surface 107. Furrow opener assemblies 109 are mounted on the implement frame 103 and each furrow opener assembly 109 extends rearward from a lateral frame member 111 of the implement frame 103 and comprises a front link member 113 fixed to the lateral frame member 111, and upper and lower parallel arm members 115A, 115B are pivotally attached at front ends thereof to the front link member 113 about corresponding upper and lower front pivot axes UFA, LFA oriented substantially horizontally and perpendicular to the operating travel direction T, and pivotally attached at rear ends thereof to a rear link member 117 about corresponding upper and lower rear pivot axes URA, LRA oriented substantially parallel to the front pivot axes UFA, ULA.

A furrow opener bracket 119 is attached to the rear link member 117, and a furrow opener 121 is attached to a lower portion of the furrow opener bracket 119. The furrow opener 121 is operative to form a furrow 123 when a bottom end thereof is engaged in the ground 107. A packer wheel arm 125 is attached to the rear link 117 and a packer wheel 127 is rotatably attached to a rear end of the packer wheel arm 125. The relative position of the packer wheel 127 and furrow opener 121 may be adjustable to provide a wider range of furrow depth however during a seeding operation the furrow opener 121 and the packer wheel 127 are in fixed positions with respect to the rear link member 117.

In the alternate apparatus 101, the lateral frame members 111 are rotatably mounted to the implement frame 103 about a lateral rotation axis LR oriented substantially parallel to the pivot axes UFA, LFA, URA, LRA and the pivot angle PN is adjusted by rotating the lateral frame member 111 and the front link member 113 attached thereto. A lock mechanism 133 is operative to secure the lateral frame member 111 at a selected rotational position. In the illustrated apparatus 101 the lateral rotation axis LR passes through the front pivot line FPL at a mid-point between the upper and lower frame pivot axes UFA, LFA.

FIG. 6 shows the lateral frame member 111 oriented so the front pivot line is oriented at a first pivot angle PNA and the furrow opener 121 forms a furrow 123, while FIG. 7 shows the lateral frame member 111 oriented so the front pivot line is oriented at a second pivot angle PNB and the furrow opener 121 forms a deeper furrow 123'. The first pivot angle PNA is only three degrees greater than the second pivot angle PNB and results in a furrow depth increase of almost one inch.

FIGS. 6 and 7 also illustrate how the fore and aft presentation angle FN of the furrow opener 121 with respect to the ground surface 107 changes as the pivot angle PN changes. A change in the pivot angle PN causes an equal change in the presentation angle FN. The pivot angle PN decreases by about three degrees from the pivot angle PNA of FIG. 6 to the pivot angle PNA of FIG. 5 and the presentation angle FN correspondingly increases by about three degrees from the presentation angle FNA shown in FIG. 6 to the presentation angle FNB shown in FIG. 7.

The angular relationship between the furrow opener 121 and the ground surface 107 dictates the form of the furrow 123 made, and the relationship between the furrow opener 121 and a product tube delivering agricultural products to the furrow 123 dictates the location of the agricultural product in the furrow 123. Thus the furrow opener 121 must be designed to operate satisfactorily within a contemplated range of presentation angles FN that the opener will encounter during use.

In a typical seeding operation a desired range of furrow depths might be about two inches, for example between one half inch to two and one half inches. The illustrated seeding apparatus 101 could then provide satisfactory operation for furrow openers 121 with a range of presentation angle that is plus or minus three degrees. For furrow openers where the presentation angle is more critical, the present disclosure also provides further embodiments described below where the presentation angle is kept constant as the furrow depth is changed.

Figure 8:
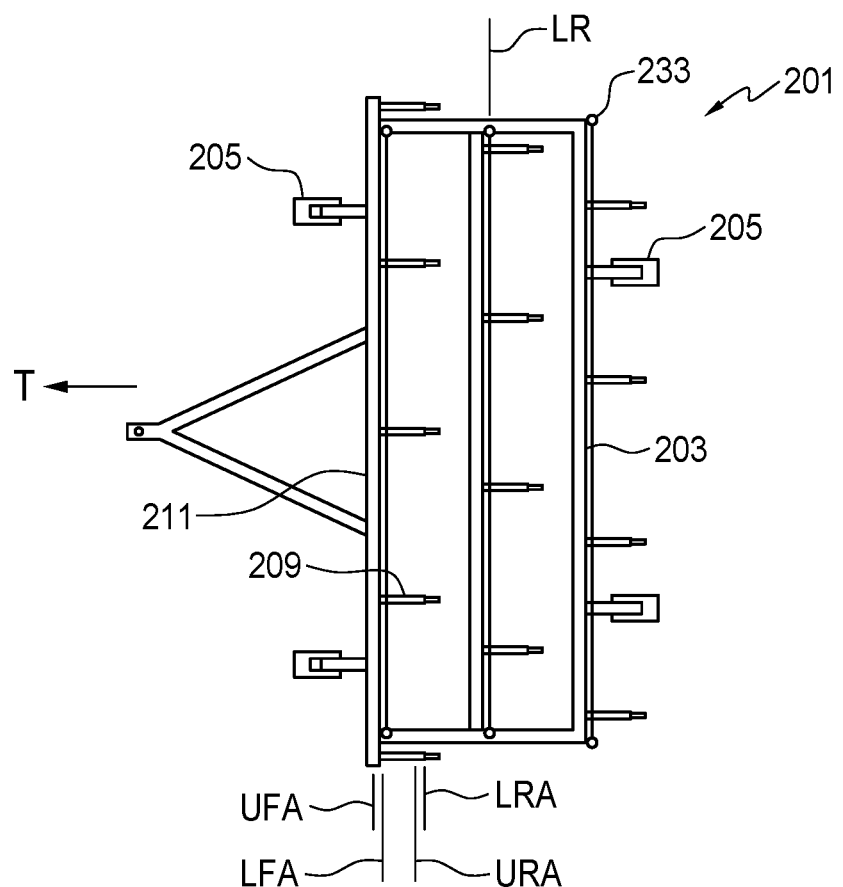
FIG. 8 is a schematic top view of a further alternate embodiment of the seeding apparatus of the present disclosure.
Figure 9:
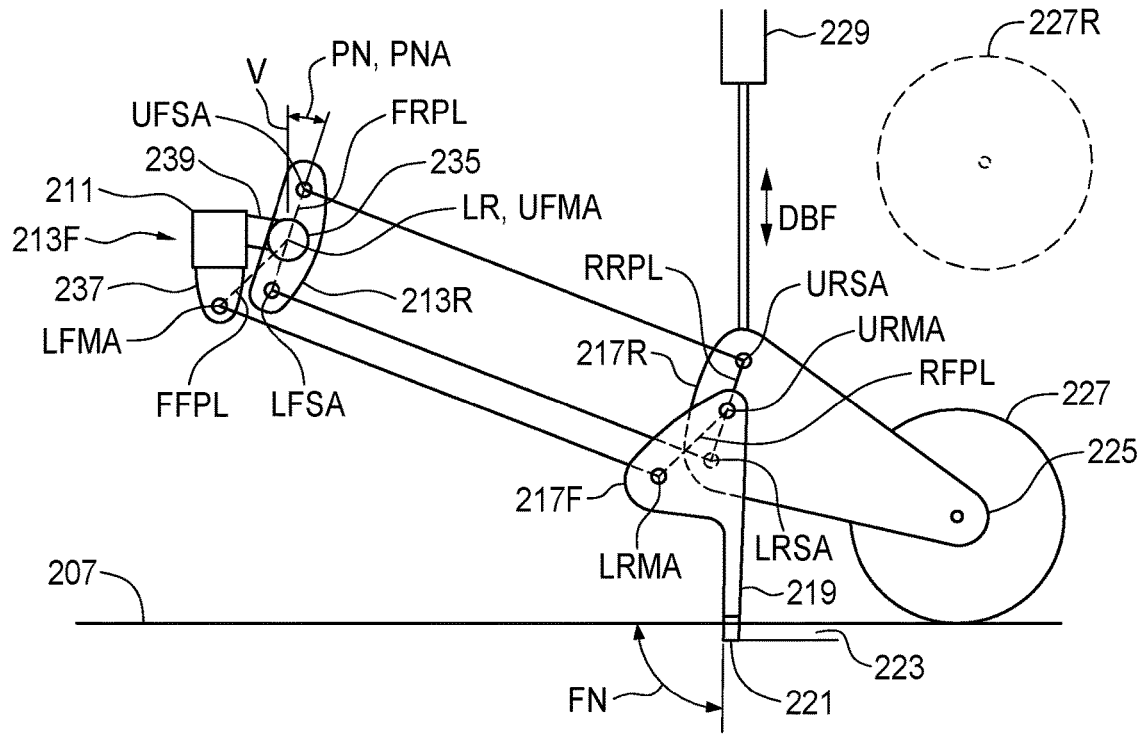
FIG. 9 is a schematic side view of a furrow opener assembly of the embodiment of FIG. 8 shown in a first position forming a furrow with a first depth.
Figure 10:
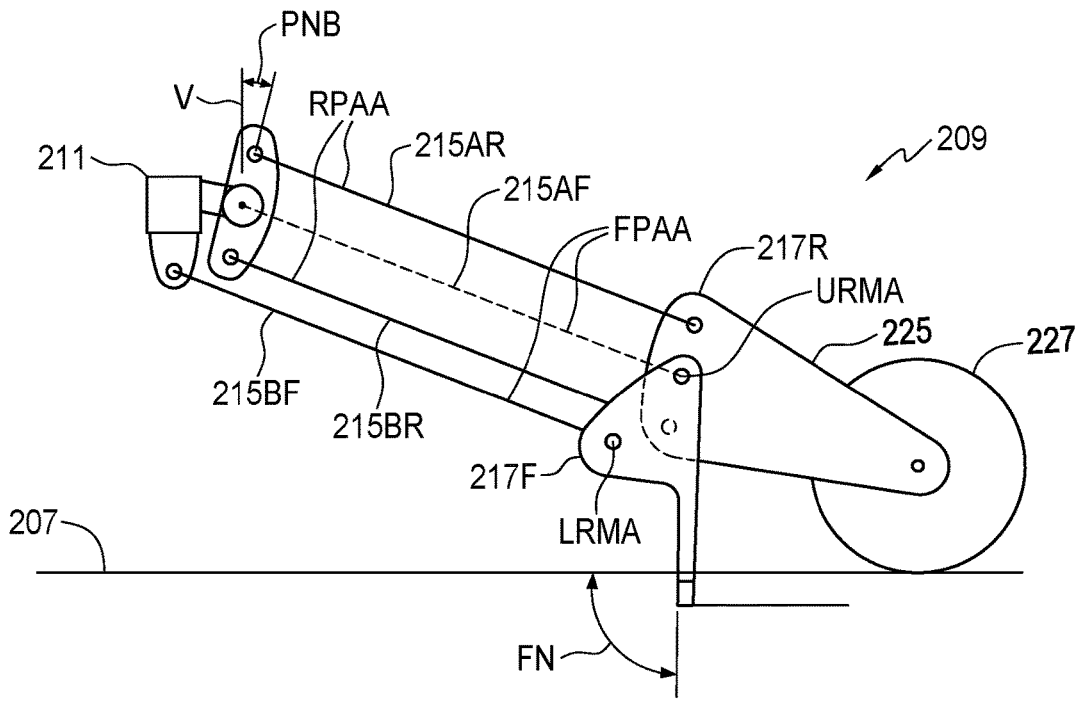
FIG. 10 is a schematic side view of a furrow opener assembly of the embodiment of FIG. 8 shown in a second position forming a furrow with a second depth greater than the first depth.

FIGS. 8-10 schematically illustrate an alternate apparatus 201 of the present disclosure comprising an implement frame 203 mounted on wheels 205 for travel over the ground 207 in an operating travel direction T. In the apparatus 201 the wheels 205 support the implement frame 203 at a constant height above the ground surface 207.

A rockshaft 235 is rotatably attached to a lateral frame member 211 of the implement frame 203 about a lateral rotation axis LR, and a lock mechanism 233 is operative to secure the rockshaft 235 at a selected rotational position.

A plurality of furrow opener assemblies 209 are attached to the implement frame 203. Each furrow opener assembly 209 extends rearward from the lateral frame member 211 and the rockshaft 235 and each furrow opener assembly 209 comprises two separate parallel arm assemblies.

A frame parallel arm assembly FPAA comprises a front frame link member 213F fixed to the lateral frame member 211. In the apparatus 201 the front frame link member 213F is provided by the link bracket 237 extending down from the lateral frame member 211 and the rockshaft bracket 239 mounting the rockshaft 235 to the lateral frame member 211. The link bracket 237 and rockshaft 235 are thus in fixed positions with respect to each other, and the link bracket 237 defines the lower front frame pivot axis LFMA and the lateral rotation axis LR provides the upper front frame pivot axis UFMA. A rear frame link member 217F defines upper and lower rear frame pivot axes URMA, LRMA, wherein the frame pivot axes are arranged so that a front frame pivot line FFPL between the upper and lower front frame pivot axes UFMA, LFMA and a rear frame pivot line RFPL between the upper and lower rear frame pivot axes URMA, LRMA, are parallel and of equal length.

A rockshaft parallel arm assembly RPAA comprises a front rockshaft link member 213R fixed to the rockshaft 235 and defining upper and lower front rockshaft pivot axes UFSA, LFSA and a rear rockshaft link member 217R defining upper and lower rear rockshaft pivot axes URSA, LRSA, wherein the rockshaft pivot axes are arranged so that a front rockshaft pivot line FRPL between the upper and lower front rockshaft pivot axes UFSA, LFSA and a rear rockshaft pivot line RRPL between the upper and lower rear rockshaft pivot axes URSA, LRSA are parallel and of equal length.

A furrow opener bracket 219 is fixed to the rear frame link member 217F which is pivotally attached to the rear rockshaft link member 217R about the upper rear frame axis URMA. A furrow opener 221 is attached to a lower portion of the furrow opener bracket 219 and is operative to form a furrow 223 when a bottom end thereof is engaged in the ground 207. A packer wheel arm 225 is attached to the rear rockshaft link member 217R and pivotally attached to the rear frame link member 217F about the upper rear frame axis URMA. A packer wheel 227 is rotatably attached to a rear end of the packer wheel arm 225.

A bias element, illustrated as a hydraulic cylinder 229, is operative to exert a downward bias force DBF on the furrow opener assembly 209, and a raising mechanism, here provided by the same hydraulic cylinder 229, is operative to move the furrow opener assembly 209 between the illustrated lowered operating position and a raised transport position indicated by the raised packer wheel 227R.

The furrow depth of the furrow 223 is adjusted from a first depth shown in FIG. 9 to a second depth shown in FIG. 10 by rotating the rockshaft 235 from a first rotational position to a second rotational position, and the illustrated frame and rockshaft parallel arm assemblies maintain the fore and aft presentation angle FN of the furrow opener at a constant angle.

In the apparatus 201 the furrow opener bracket 219 is fixed to the rear frame link member 217F and the packer wheel arm 225 is fixed to the rear rockshaft link member 217R, and the rear frame link member 217F is pivotally attached to the rear rockshaft link member 217R about the upper rear frame pivot axis URMA. The front rockshaft link member 213R is fixed to the rockshaft 235 such that the lateral rotation axis LR is located on the front rockshaft pivot line FRPL between the upper and lower front rockshaft pivot axes UFSA, LFSA. The upper frame front pivot axis UFMA coincides with the lateral rotation axis LR, and the rear frame link member 217F is pivotally attached to the rear rockshaft link member 217R about the upper rear frame pivot axis URMA at a location on the rear rockshaft pivot line RRPL between the upper and lower rear rockshaft pivot axes URSA, LRSA corresponding to the location of the lateral rotation axis such that a virtual upper frame arm 215AF is formed between the upper frame front pivot axis UFMA and the upper frame rear pivot axis URMA that is parallel to the lower frame arm 215BF.

The rockshaft parallel arm assembly RPAA comprises equal length upper and lower rockshaft arms 215AR, 215BR pivotally attached at front and rear ends thereof to the front and rear rockshaft link members 213R, 217R about the corresponding upper and lower front and rear rockshaft pivot axes UFSA, LFSA, URSA, LRSA. In the illustrated furrow opener assembly 209 the frame parallel arm assembly FPAA comprises the virtual upper frame arm 215AF and a lower frame arm 215BF pivotally attached at front and rear ends thereof to the front and rear frame link members 213F, 217F about the corresponding lower front and rear frame pivot axes LFMA, LRMA under the lower rockshaft arm 215BR.

The furrow depth is increased by rotating the rockshaft 235 such that the upper front rockshaft pivot axis UFSA is moved forward with respect to the lower front rockshaft pivot axis LFSA, decreasing the pivot angle PN between the front rockshaft pivot line FRPL and the vertical orientation V from the pivot angle PNA shown in FIG. 9 to the lesser angle PNB shown in FIG. 10. Again a three degree difference results in a furrow depth increase of almost an inch. Similarly the furrow depth is decreased by rotating the rock shaft 235 such that the upper front rockshaft pivot axis UFSA is moved rearward with respect to the lower front rockshaft pivot axis LFSA, increasing the pivot angle PN.

The use of two parallel arm assemblies allows one, in this case the rockshaft parallel arm assembly RPAA, to maintain the vertical position of the furrow opener 221 with respect to the packer wheel 227 constant while the other, in this case the frame parallel arm assembly FPAA to maintain the presentation angle FN constant as rockshaft 235 is rotated to change the depth of the furrow 223.

Figure 11:
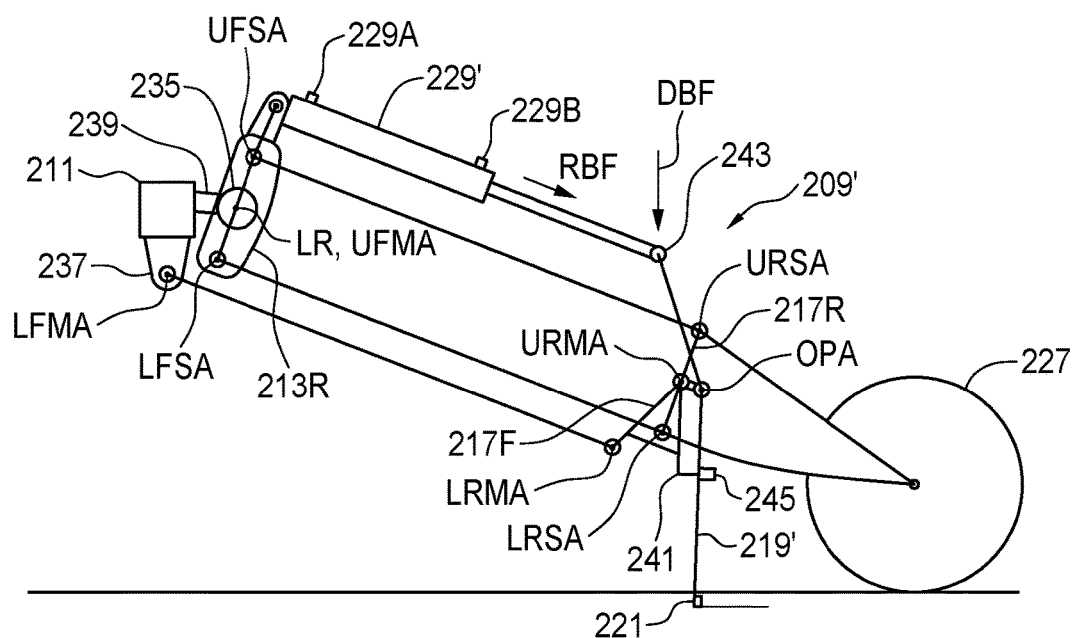
FIG. 11 is a schematic side view of an alternate furrow opener assembly for use with the embodiment of FIG. 8 shown in a first position forming a furrow.
Figure 12:
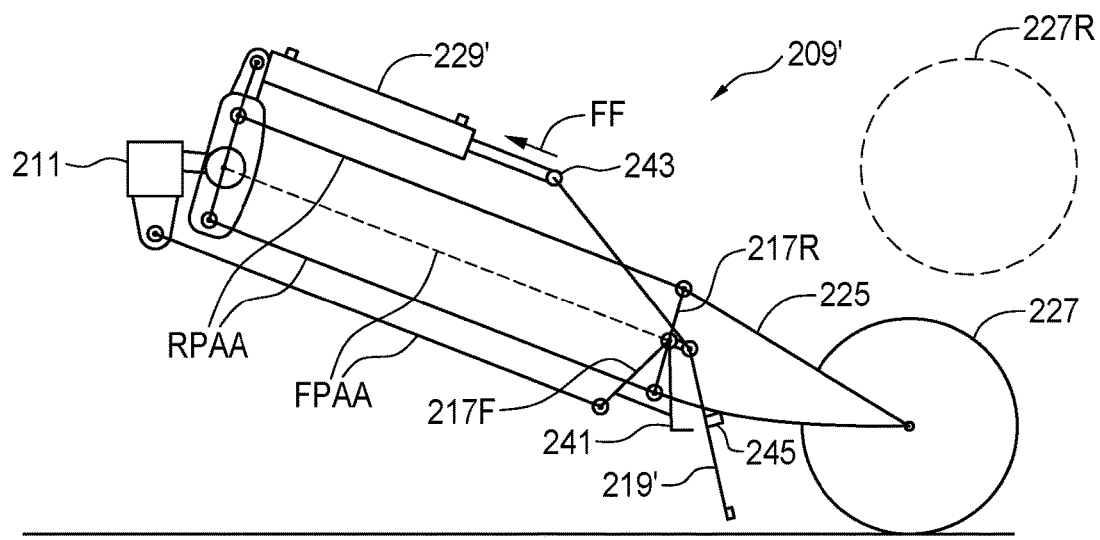
FIG. 12 is a schematic side view of the alternate furrow opener assembly of FIG. 11 shown with the furrow opener above the ground and the hydraulic cylinder moving the furrow opener assembly toward the raised position.

FIGS. 11 and 12 schematically illustrate a variation 209' of the furrow opener assembly 209 shown in FIGS. 8-10. Instead of the furrow opener bracket being fixed to the rear frame link member 217F, a bracket stop 241 is fixed to the rear frame link member 217F and the furrow opener bracket 219' is pivotally attached to the rear rockshaft link member 217R about opener pivot axis OPA and is connected during operation to the rear frame link member 217F by bearing against the bracket stop 241. The furrow opener bracket 219' extends upward to a top end 243 thereof above the rear rockshaft link member 217R, and the bias element, illustrated as hydraulic cylinder 229', exerts a rearward bias force RBF on the top end 243 of the furrow opener bracket 219' to force the furrow opener bracket 219' against the bracket stop 241 and to exert the downward bias force DBF on the top end 243 of the furrow opener bracket 219'.

Pressurized hydraulic fluid is directed into a first end 229A of the hydraulic cylinder 229' to exert the downward bias force DBF and pressurized hydraulic fluid is directed into an opposite second end 229B of the hydraulic cylinder 229' such that the hydraulic cylinder 229' exerts a forward force FF on the top end 243 of the furrow opener bracket 219' which pivots the furrow opener bracket 219' about the opener pivot axis OPA to the position of FIG. 12 where a raising block 245 contacts the packer wheel arm 225 and further forward movement of the top end 243 of the furrow opener bracket 219' raises the furrow opener assembly 209' to the raised transport position indicated by the packer wheel 227R. Furrow depth adjustments are made in the same fashion as with the furrow opener assembly 209 by rotating the rockshaft 235.

FIG. 12 also shows a tripped position for the furrow opener bracket 219' such as would occur when the furrow opener encounters an obstruction such as a rock that forces the furrow opener bracket 219' rearward overcoming the bias force RBF exerted by the hydraulic cylinder 229'. It will be understood in this disclosure that various trip mechanisms as are known in the art will typically be incorporated in the furrow opener assemblies to allow the furrow opener to move out of the illustrated operating positions to a tripped position.

Figure 13:
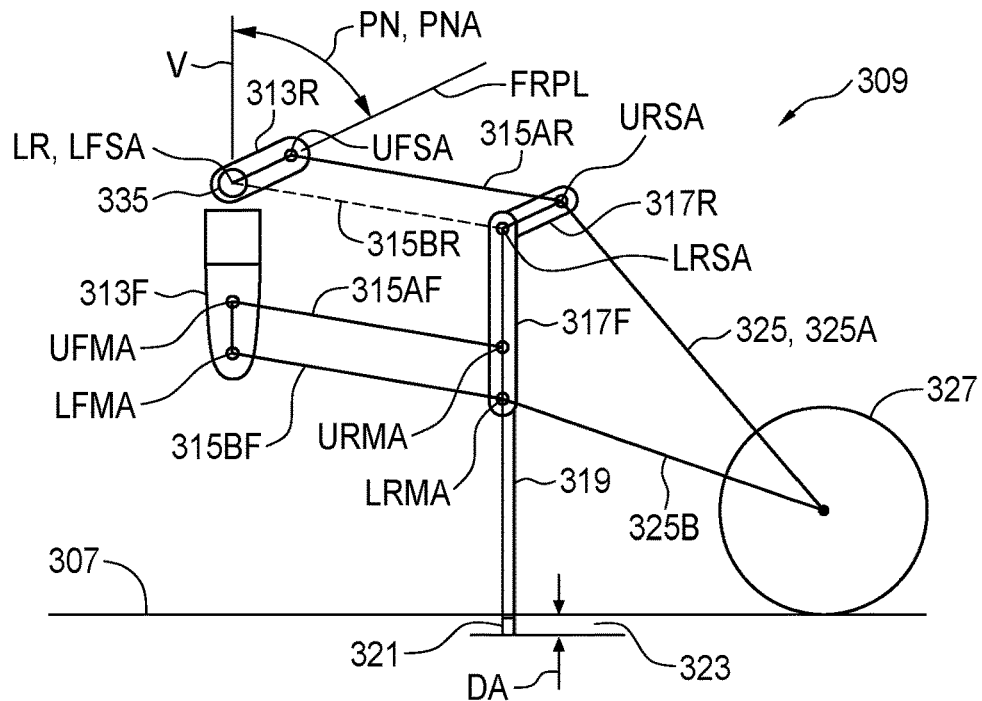
FIG. 13 is a schematic side view of a further alternate furrow opener assembly for use with the embodiment of FIG. 8 shown in a first position forming a furrow with a first depth.
Figure 14:
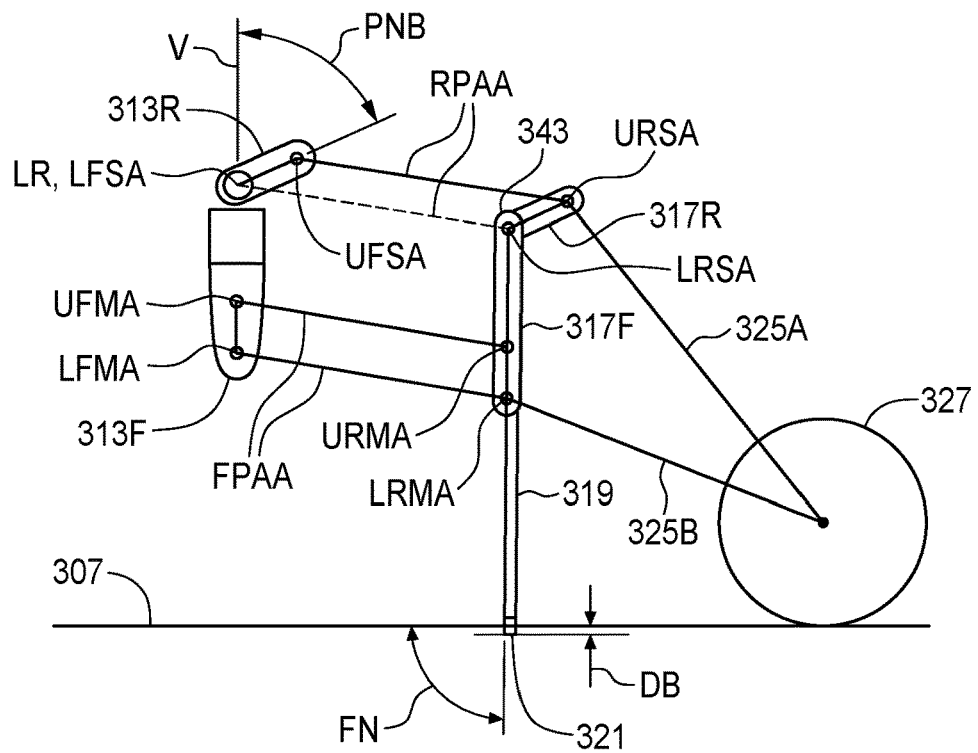
FIG. 14 is a schematic side view of the furrow opener assembly of FIG. 13 shown in a second position forming a furrow with a second depth less than the first depth.

FIGS. 13 and 14 schematically illustrate a further alternate furrow opener assembly 309 comprising frame and rockshaft parallel arm assemblies where the furrow opener bracket 319 is fixed to the rear frame link member 317F and the packer wheel arm 325 is pivotally attached to the rear frame link member 317F and is pivotally attached to the rear rockshaft link member 317R. The furrow opener assembly 309, like the furrow openers 209, 209' described above, also maintains a constant presentation angle FN for the furrow opener 321 while allowing the furrow depth to be changed by rotating the rockshaft 335.

Here the rockshaft 335 is above the frame parallel arm assembly FPAA. The front rockshaft link member 313R of the rockshaft parallel arm assembly RPAA is fixed to the rockshaft 335 such that the lateral rotation LR axis coincides with the lower front rockshaft pivot axis LFSA. The rear frame link member 317F of the frame parallel arm assembly FPAA extends above the upper parallel arm member 315AF of the frame parallel arm assembly FPAA and is pivotally attached to the rear rockshaft link member 317R about the lower rear rockshaft pivot axis LRSA.

The packer wheel arm 325 comprises an upper packer arm 325A pivotally attached at a front end thereof to the rear rockshaft link member 317R about the upper rear rockshaft pivot axis URSA and a lower packer arm 325B pivotally attached to the rear frame link member 317F about the lower rear frame pivot axis LRMA. The upper and lower packer arms 325A, 325B are attached at rear portions thereof to each other and rotatably attached to the packer wheel 327.

The frame parallel arm assembly FPAA comprises equal length upper and lower frame arms 315AF, 315BF pivotally attached at front and rear ends thereof to the front and rear frame link members 313F, 317F about the corresponding upper and lower front and rear frame pivot axes UFMA, LFMA, URMA, LRMA.

The rockshaft parallel arm assembly RPAA comprises an upper rockshaft arm 315AR pivotally attached at front and rear ends thereof to the front and rear rockshaft link members 313R, 317R about the corresponding upper front and rear rockshaft pivot axes UFSA, URSA, and a virtual lower rockshaft arm 315BR that is formed between the front lower rockshaft pivot axis LFSA and the lower rockshaft rear pivot axis LRSA.

Here the rear frame link member 317F of the frame parallel arm assembly FPAA maintains the furrow opener bracket 319 attached thereto, and thus the furrow opener 321, at a constant presentation angle FN with respect to the ground 307. The rear frame link member 317F is also attached to the rear rockshaft link member 317R and so maintains the packer wheel 327 and furrow opener 321 at a constant vertical relationship, which can be changed by rotating the rockshaft 335 to change the pivot angle PN between the front rockshaft pivot line FRPL and the vertical orientation V.

With the rockshaft 335 fixed at a first fixed rotation position shown in FIG. 13 with the pivot angle PNA, the furrow depth is DA. Rotating the rockshaft 335 to a second fixed rotation position shown in FIG. 14 with the pivot angle increased to pivot angle PNB, the furrow depth is decreased to DB. It can be seen that increasing the pivot angle PN moves the packer wheel 337 down with respect to the furrow opener 321 and thus reduces the depth of the furrow 323.

The present disclosure further provides a method of forming a furrow 23 in a ground surface 7. The method comprises connecting a front link member 13 of a parallel arm assembly to a lateral frame member 11 of an implement frame 3 mounted on wheels 5 for travel over the ground surface 7 in an operating travel direction such that the parallel arm assembly extends rearward from the lateral frame member 11; wherein a front pivot line FPL connects upper and lower front pivot axes UFA, LFA of the parallel arm assembly and is substantially parallel to a rear pivot line RPL connecting upper and lower rear pivot axes URA, LRA of the parallel arm assembly, and the front and rear pivot lines FPL, RPL are oriented at a pivot angle PN with respect to a vertical orientation V; connecting a furrow opener bracket 19 to a rear link member 17 of the parallel arm assembly, and attaching a furrow opener 21 to a lower portion of the furrow opener bracket 19, wherein the furrow opener 21 is operative to form the furrow 23 when a bottom end thereof is engaged in the ground surface 7; supporting the rear link member 17 with a packer wheel 27 rearward of the furrow opener 21; exerting a downward bias force DBF on the parallel arm assembly such that the furrow opener 21 engages the ground surface 7; moving the implement frame 3 across the ground surface 7 to create the furrow 23; orienting the pivot angle PN at a first pivot angle PNA to form the furrow with a first furrow depth, and orienting the pivot angle PN at a second pivot angle PNB to form the furrow with a second furrow depth different from the first furrow depth.

In one embodiment the method comprises rigidly attaching the front link member 13 to the lateral frame member 11, and attaching the furrow opener bracket 19 and the packer wheel 27 to the rear link member 17 such that during operation the rear link member 17, the furrow opener 21, and the packer wheel 27 are in fixed positions with respect to each other.

In the illustrated furrow opener assembly 9 of the seeding apparatus 1 the upper front pivot axis UFA moves rearward with respect to the lower front pivot axis LFA when the pivot angle PN changes from the first pivot angle PNA to the second pivot angle PNB, and the first furrow depth is greater than the second furrow depth. Similarly the upper front pivot axis UFA moves forward with respect to the lower front pivot axis LFA when the pivot angle PN changes from the second pivot angle PNB to the third pivot angle PNC, and wherein the second furrow depth is less than the third furrow depth.

The method can comprise changing the pivot angle PN by raising and lowering a front end 3F of the implement frame 3 with respect to a rear end 3r of the implement frame 3 as schematically illustrated in FIGS. 2-4. Alternately the method can comprise rotatably mounting the lateral frame member 111 to the implement frame 103 about a lateral rotation axis LR oriented substantially parallel to the front and rear pivot axes UFA, LFA, URA, LRA and changing the pivot angle PN by rotating the lateral frame member 111 about the lateral rotation axis LR as schematically illustrated in FIGS. 6 and 7.

The method of forming a furrow in a ground surface 207 can further comprise rotatably mounting a rockshaft 235 to the implement frame 203 about a lateral rotation axis LR as schematically illustrated in the furrow opener assembly 209 of FIGS. 9 and 10 comprising a frame parallel arm assembly FPAA and a rockshaft parallel arm assembly RPAA. The furrow opener bracket 219 is pivotally attached to the rear rockshaft link member 217R and connected during operation to the rear frame link member 271F. A packer wheel arm 225 is connected to the rear frame link member 217F and the rear rockshaft link member 217R and the packer wheel 227 is rotatably attached to a rear end of the packer wheel arm 225. Exerting the downward bias force DBF on the parallel arm assembly causes the furrow opener 221 to engage the ground surface 207 as the implement frame 203 moves across the ground surface 207, and orienting the pivot angle PN at a first pivot angle PNA forms the furrow 223 with a first furrow depth, and orienting the pivot angle PN at a second pivot angle PNB forms the furrow 223 with a second furrow depth different from the first furrow depth. The method includes configuring the furrow opener assembly 209 to maintain a fore and aft presentation angle FN of the furrow opener 221 with respect to the ground at a constant angle as the rockshaft pivot angle PN changes.

In the furrow opener assembly 209, the method comprises fixing the packer wheel arm 225 to the rear rockshaft link member 217R, and pivotally attaching the rear frame link member 217F to the rear rockshaft link member 217R; fixing the front rockshaft link member 213R to the rockshaft 235 such that the lateral rotation axis LR is located on the front rockshaft pivot line FRPL midway between the upper and lower front rockshaft pivot axes UFSA, LFSA; configuring the front frame link member 213F such that the upper frame front pivot axis UFMA coincides with the lateral rotation axis LR; and pivotally attaching the rear frame link member 217F to the rear rockshaft link member 217R about the upper rear frame pivot axis URMA at a location on the rear rockshaft pivot line RRPL midway between the upper and lower rear rockshaft pivot axes URSA, LRSA such that a virtual upper frame arm 215AF is formed between the upper frame front pivot axis UFMA and the upper frame rear pivot axis URMA.

As schematically illustrated in the furrow opener assembly 209' of FIGS. 11 and 12, the method can also comprise fixing a bracket stop 241 to the rear frame link member 217F and pivotally attaching the furrow opener bracket 219' to the rear rockshaft link member 217R and during operation connecting the furrow opener bracket 219' to the rear frame link member 217F by forcing the furrow opener bracket 219' against the bracket stop 241; and during operation fixing the packer wheel 227 in a fixed position with respect to the rear rockshaft link member 217R. The furrow opener bracket 219' extends upward to a top end 243 thereof above the rear rockshaft link member 217R, and a hydraulic cylinder 229' exerts a bias force RBF rearward and downward on the top end 243 of the furrow opener bracket 219' to force the furrow opener bracket 219' against the bracket stop 241 and to exert the downward bias force DBF on the top end 243 of the furrow opener bracket 219'. Pressurized hydraulic fluid is directed into a first end 229A of the hydraulic cylinder 229' to exert the downward bias force DBF and pressurized hydraulic fluid is directed into an opposite second end 229B of the hydraulic cylinder 229' to move the furrow opener assembly 209' to the raised transport position.

FIGS. 13 and 14 schematically illustrate a further method of forming a furrow in a ground surface by rotatably mounting a rockshaft 335 to the implement frame about a lateral rotation axis LR and using both a frame parallel arm assembly FPAA and a rockshaft parallel arm assembly RPAA. The method comprises pivotally attaching the packer wheel arm 325 to the rear frame link member 317F and to the rear rockshaft link member 317R; positioning the rockshaft 335 above the frame parallel arm assembly; fixing the front rockshaft link member 313R to the rockshaft 335 such that the lateral rotation axis LR coincides with the lower front rockshaft pivot axis LFSA; extending the rear frame link member 317F above the frame parallel arm assembly FPAA and pivotally attaching a top end 343 thereof to the rear rockshaft link member 317R about the lower rear rockshaft pivot axis LRSA; and configuring the packer wheel arm 325 to comprise an upper packer arm 325A pivotally attached at a front end thereof to the rockshaft link member 317R about the upper rear rockshaft pivot axis URSA and a lower packer arm 325B pivotally attached about the lower rear frame pivot axis LRMA to the rear frame link member 317F, and wherein the upper and lower packer arms 325A, 325B are attached at rear portions thereof to each other. The method includes configuring the furrow opener assembly 309 to maintain a fore and aft presentation angle FN of the furrow opener 321 with respect to the ground 307 at a constant angle as the rockshaft pivot angle PN changes.

The present disclosure provides a seeding apparatus with trailing arm furrow opener assemblies where the depth of the furrow formed by the furrow openers can be quickly changed to suit different crops and soil conditions. The depth of penetration of all the furrow openers on a seeding implement can be adjusted at the same time. In some embodiments the presentation angle of the furrow opener with respect to the ground surface can be maintained at a constant desired angle.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seeding apparatus comprising:
    an implement frame mounted on wheels for travel over the ground in an operating travel direction;
    a furrow opener assembly extending rearward from a lateral frame member of the implement frame and comprising:
        a front link member fixed to the lateral frame member, and upper and lower parallel arm members pivotally attached at front ends thereof to the front link member about corresponding upper and lower front pivot axes oriented substantially horizontally and perpendicular to the operating travel direction, and pivotally attached at rear ends thereof to a rear link member about corresponding upper and lower rear pivot axes oriented substantially parallel to the front pivot axes;
        a furrow opener bracket attached to the rear link member, and a furrow opener attached to a lower portion of the furrow opener bracket, the furrow opener operative to form a furrow when a bottom end thereof is engaged in the ground;
        a packer wheel arm attached to the rear link member and a packer wheel rotatably attached to a rear end of the packer wheel arm;

where in operation the furrow opener and the packer wheel are in fixed positions with respect to the rear link member;
a bias element operative to exert a downward bias force on the furrow opener assembly;
a raising mechanism operative to move the furrow opener assembly between a lowered operating position and a raised transport position;
wherein a front pivot line connecting the upper and lower front pivot axes is substantially parallel to a rear pivot line connecting the upper and lower rear pivot axes, and the front and rear pivot lines are oriented at a pivot angle with respect to a vertical orientation; and
wherein the pivot angle is adjustable to vary a furrow depth of the furrow.

2. The apparatus of claim 1 wherein the pivot angle is adjusted by selectively tilting a front end of the implement frame up or down with respect to a rear end of the implement frame to adjust the pivot angle.

3. The apparatus of claim 2 wherein the furrow depth is decreased by tilting the front end of the implement frame up with respect to the rear end thereof to move the upper front pivot axis rearward with respect to the lower front pivot axis.

4. The apparatus of claim 2 wherein the furrow depth is increased by tilting the front end of the implement frame down with respect to the rear end thereof to move the upper front pivot axis forward with respect to the lower front pivot axis.

5. The apparatus of claim 2 wherein the implement frame is mounted on front wheels and rear wheels, and wherein at least one of the front wheels and the rear wheels are moved selectively up or down with respect to the implement frame to tilt the front end of the implement frame up or down with respect to the rear end of the implement frame.

6. The apparatus of claim 5 wherein the front wheels are moved downward and the rear wheels are moved upward with respect to the implement frame to tilt the front end of the implement frame up with respect to the rear end thereof.

7. The apparatus of claim 5 wherein the front wheels are moved upward and the rear wheels are moved downward with respect to the implement frame to tilt the front end of the implement frame down with respect to the rear end thereof.

8. The apparatus of claim 1 wherein the lateral frame member is rotatably mounted to the implement frame about a lateral rotation axis oriented substantially parallel to the upper and lower front and rear pivot axes and wherein the pivot angle is adjusted by rotating the lateral frame member and the front link member attached thereto, and comprising a lock mechanism operative to secure the lateral frame member at a selected rotational position.

9. The apparatus of claim 8 wherein the lateral rotation axis passes through the front pivot line at a mid-point thereof.

10. The apparatus of claim 1 wherein a vertical position of the packer wheel with respect to the furrow opener is adjustable.

11. A seeding apparatus comprising:
an implement frame mounted on wheels for travel over the ground in an operating travel direction;
a rockshaft rotatably attached to a lateral frame member of the implement frame about a lateral rotation axis, and a lock mechanism operative to secure the rockshaft at a selected rotational position;
a furrow opener assembly extending rearward from the lateral frame member and the rockshaft, the furrow opener assembly comprising:
a frame parallel arm assembly comprising a front frame link member fixed to the lateral frame member and defining upper and lower front frame pivot axes, and a rear frame link member defining upper and lower rear frame pivot axes, wherein the frame pivot axes are arranged so that a front frame pivot line between the upper and lower front frame pivot axes and a rear frame pivot line between the upper and lower rear frame pivot axes are substantially parallel and of substantially equal length;
a rockshaft parallel arm assembly comprising a front rockshaft link member fixed to the rockshaft and defining upper and lower front rockshaft pivot axes and a rear rockshaft link member defining upper and lower rear rockshaft pivot axes, wherein the rockshaft pivot axes are arranged so that a front rockshaft pivot line between the upper and lower front rockshaft pivot axes and a rear rockshaft pivot line between the upper and lower rear rockshaft pivot axes are substantially parallel and of substantially equal length;
a furrow opener bracket attached to the rear rockshaft link member and connected during operation to the rear frame link member with a furrow opener attached to a lower portion of the furrow opener bracket, the furrow opener operative to form a furrow when a bottom end thereof is engaged in the ground;
a packer wheel arm attached to the rear frame link member and the rear rockshaft link member and a packer wheel rotatably attached to a rear end of the packer wheel arm;
a bias element operative to exert a downward bias force on the furrow opener assembly;
a raising mechanism operative to move the furrow opener assembly between a lowered operating position and a raised transport position;
wherein a furrow depth of the furrow is adjusted from a first depth to a second depth by rotating the rockshaft from a first rotational position to a second rotational position; and
wherein a fore and aft presentation angle of the furrow opener with respect to the ground is maintained at a constant angle.

12. The apparatus of claim 11 wherein during operation the furrow opener bracket is fixed to the rear frame link member and the packer wheel arm is fixed to the rear rockshaft link member, and the rear frame link member is pivotally attached to the rear rockshaft link member.

13. The apparatus of claim 12 wherein:
the front rockshaft link member is fixed to the rockshaft such that the lateral rotation axis is located on the front rockshaft pivot line between the upper and lower front rockshaft pivot axes;
the upper frame front pivot axis coincides with the lateral rotation axis, and the rear frame link member is pivotally attached to the rear rockshaft link member about the upper rear frame pivot axis at a location on the rear rockshaft pivot line between the upper and lower rear rockshaft pivot axes corresponding to the location of the lateral rotation axis such that a virtual upper frame arm is formed between the upper frame front pivot axis and the upper frame rear pivot axis that is parallel to a lower frame arm extending between the lower front pivot axis and the lower rear frame pivot axis.

14. The apparatus of claim 13 wherein:
the rockshaft parallel arm assembly comprises equal length upper and lower rockshaft arms pivotally attached at front and rear ends thereof to the front and rear rockshaft link members about the corresponding upper and lower front and rear rockshaft pivot axes;
the frame parallel arm assembly comprises the virtual upper frame arm and a lower frame arm pivotally attached at front and rear ends thereof to the front and rear frame link members about the corresponding lower front and rear frame pivot.

15. The apparatus of claim 14 wherein the furrow depth is increased by rotating the rockshaft such that the upper front rockshaft pivot axis is moved forward with respect to the lower front rockshaft pivot axis, and the furrow depth is decreased by rotating the rock shaft such that the upper front rockshaft pivot axis is moved rearward with respect to the lower front rockshaft pivot axis.

16. The apparatus of claim 11 comprising a bracket stop fixed to the rear frame link member and wherein the furrow opener bracket is pivotally attached to the rear rockshaft link member and is connected during operation to the rear frame link member by bearing against the bracket stop; and wherein during operation the packer wheel is in a fixed position with respect to the rear rockshaft link member.

17. The apparatus of claim 16 wherein:
the front rockshaft link member is fixed to the rockshaft such that the lateral rotation axis is located on the front rockshaft pivot line between the upper and lower front rockshaft pivot axes;
the upper frame front pivot axis coincides with the lateral rotation axis, and the rear frame link member is pivotally attached to the rear rockshaft link member about the upper rear frame pivot axis at a location on the rear rockshaft pivot line between the upper and lower rear rockshaft pivot axes corresponding to the location of the lateral rotation axis such that a virtual upper frame arm is formed between the upper frame front pivot axis and the upper frame rear pivot axis that is parallel to a lower frame arm extending between the lower front pivot axis and the lower rear frame pivot axis.

18. The apparatus of claim 17 wherein
the rockshaft parallel arm assembly comprises equal length upper and lower rockshaft arms pivotally attached at front and rear ends thereof to the front and rear rockshaft link members about the corresponding upper and lower front and rear rockshaft pivot axes;
the frame parallel arm assembly comprises the virtual upper frame arm and a lower frame arm pivotally attached at front and rear ends thereof to the front and rear frame link members about the corresponding lower frame front and rear pivot axes.

19. The apparatus of claim 18 wherein the furrow opener bracket extends upward to a top end thereof above the rear rockshaft link member, and wherein the bias element exerts a rearward bias force on the top end of the furrow opener bracket to force the furrow opener bracket against the bracket stop and to exert the downward bias force on the top end of the furrow opener bracket.

20. The apparatus of claim 19 wherein the bias element comprises a hydraulic cylinder and wherein pressurized hydraulic fluid is directed into a first end of the hydraulic cylinder to exert the downward bias force and pressurized hydraulic fluid is directed into an opposite second end of the hydraulic cylinder to move the furrow opener assembly to the raised transport position.

21. The apparatus of claim 11 wherein the furrow opener bracket is fixed to the rear frame link member and the packer wheel arm is pivotally attached to the rear frame link member and is pivotally attached to the rear rockshaft link member.

22. The apparatus of claim 21 wherein:
the front rockshaft link member is fixed to the rockshaft such that the lateral rotation axis coincides with the lower front rockshaft pivot axis;
the rear frame link member extends above the frame parallel arm assembly and is pivotally attached to the rear rockshaft link member about the lower rear rockshaft pivot axis;
the packer wheel arm comprises an upper packer arm pivotally attached at a front end thereof to the rear rockshaft link member and a lower packer arm pivotally attached to the rear frame link member, and wherein the upper and lower packer arms are attached at rear portions thereof to each other.

23. The apparatus of claim 22 wherein:
the frame parallel arm assembly comprises equal length upper and lower frame arms pivotally attached at front and rear ends thereof to the front and rear frame link members about the corresponding upper and lower front and rear frame pivot axes;
the rockshaft parallel arm assembly comprises an upper rockshaft arm pivotally attached at front and rear ends thereof to the front and rear rockshaft link members about the corresponding upper front and rear rockshaft pivot axes, and a virtual lower rockshaft arm that is formed between the lower front rockshaft pivot axis and the lower rockshaft rear pivot axis.

24. The apparatus of claim 23 wherein the upper packer arm is pivotally attached at the front end thereof to the rear rockshaft link member, and the lower packer arm is pivotally attached to the rear frame link member under the front end of the upper packer arm.

25. The apparatus of claim 24 wherein the upper packer arm is pivotally attached at the front end thereof to the rear rockshaft link member about the upper rear rockshaft pivot axis, and the lower packer arm is pivotally attached to the rear frame link member about the lower rear frame pivot axis.

* * * * *